United States Patent
Hirayama et al.

(10) Patent No.: US 8,144,255 B2
(45) Date of Patent: Mar. 27, 2012

(54) STILL SUBTITLE DETECTION APPARATUS AND IMAGE PROCESSING METHOD THEREFOR

(75) Inventors: Keiko Hirayama, Tokyo (JP); Himio Yamauchi, Yokohama (JP); Peishan Tsai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/721,998

(22) Filed: Mar. 11, 2010

(65) Prior Publication Data

US 2010/0328529 A1 Dec. 30, 2010

(30) Foreign Application Priority Data

Jun. 30, 2009 (JP) ................. 2009-156007

(51) Int. Cl.
*H04N 5/14* (2006.01)
*H04N 7/00* (2011.01)
*H04N 5/50* (2006.01)

(52) U.S. Cl. ............ 348/701; 348/468; 348/569

(58) Field of Classification Search ........ 348/701, 348/465, 569, 564, 441, 468; 382/176, 199, 382/200

See application file for complete search history.

(56) References Cited

U.S. PATENT DOCUMENTS

| | | | | |
|---|---|---|---|---|
| 6,301,302 B1 * | 10/2001 | Kikuchi et al. | ......... | 375/240.16 |
| 2003/0021342 A1 * | 1/2003 | Nesvadba et al. | ........ | 375/240.03 |
| 2004/0208246 A1 * | 10/2004 | Conklin | .......... | 375/240.16 |
| 2005/0196043 A1 * | 9/2005 | Jung et al. | ....... | 382/176 |
| 2009/0040377 A1 * | 2/2009 | Kurahashi et al. | ........ | 348/468 |
| 2009/0295768 A1 * | 12/2009 | Shin et al. | ....... | 345/204 |
| 2010/0254605 A1 * | 10/2010 | Wredenhagen | ........ | 382/176 |

FOREIGN PATENT DOCUMENTS

| | | |
|---|---|---|
| JP | 04-351185 | 12/1992 |
| JP | 2000-235618 A | 8/2000 |
| JP | 2002-032758 | 1/2002 |
| JP | 2005-284266 | 10/2005 |
| JP | 2008-166966 A | 7/2008 |
| JP | 2008-199464 | 8/2008 |
| JP | 2008-252561 A | 10/2008 |
| JP | 2008-306330 | 12/2008 |
| JP | 2009-17325 A | 1/2009 |

\* cited by examiner

*Primary Examiner* — Victor Kostak
(74) *Attorney, Agent, or Firm* — Patterson & Sheridan, LLP (57) ABSTRACT

According to one embodiment, to detect a still subtitle part included as a part of an image in a video signal, the still subtitle detection apparatus detects in pixel units a subtitle part from a video frame formed of pixels. The apparatus includes a subtitle part determination module and a still subtitle detection module. The subtitle part determination module determines, as the subtitle part, a pixel or pixel group on the high-luminance region side (white peak) that neighbors the detection position of an image edge where a luminance level changes or on the low-luminance region side (black bottom) that neighbors the detection position of the image edge where the luminance level changes. When it is detected that the subtitle part remains unchanged by comparing two continuous video frames along the time axis, the still subtitle detection module detects the subtitle part as a still subtitle.

19 Claims, 9 Drawing Sheets

Small region unit subtitle detection region

F I G. 5

Pixel unit subtitle detection region

(a) Previous frame

Small region unit subtitle detection region (b) nterpolating frame

Small region unit subtitle detection region (c) Current frame

Small region unit subtitle detection region

STILL SUBTITLE DETECTION APPARATUS AND IMAGE PROCESSING METHOD THEREFOR

CROSS-REFERENCE TO RELATED APPLICATIONS

This application is based upon and claims the benefit of priority from Japanese Patent Application No. 2009-156007, filed Jun. 30, 2009, the entire contents of which are incorporated herein by reference.

BACKGROUND

1. Field

One embodiment of the invention relates to a detection apparatus of a still subtitle included as a part of a picture or image in a video signal, visual equipment which displays an image including a still subtitle, and a processing method of an image including a still subtitle.

2. Description of the Related Art

A video signal of a movie often includes a still subtitle. Such a video signal may be, for example, a videoized signal (30 frames/s or 60 fields/s) produced by telecine-converting a movie film (24 frames/s) with a subtitle and applying 2-3 pull-down processing to the converted signal, or a videoized signal produced by superimposing a subtitle picture onto a telecine-converted movie film picture. Upon generating interpolating frames of pictures or images of such video signal including a still subtitle, a subtitle part is often disturbed by generating interpolating pixels of the subtitle part using wrong vectors. That video signal is visually undesirable when noise appears on the subtitle part.

In order to execute processing for reducing noise of the subtitle part of the interpolating frames, a region of a still subtitle included as a part of a picture or image in a video signal is to be detected. As methods of detecting the subtitle region, a method of detecting a subtitle region in small region (block defined by a plurality of pixels) units (cf. Jpn. Pat. Appln. KOKAI Publication No. 2008-252561), and a method of detecting a subtitle region in pixel units (cf. Jpn. Pat. Appln. KOKAI Publication No. 2009-017325) are available.

The invention of Jpn. Pat. Appln. KOKAI Publication No. 2008-252561 allows telecine processing for converting a film picture including 24 frames/s into a video picture including 30 frames/s to detect subtitle regions in a picture signal which has undergone 2-3 pull-down processing in small region (block defined by a plurality of pixels) units (see paragraphs 0004 to 0009). The invention of Jpn. Pat. Appln. KOKAI Publication No. 2008-252561 can accurately detect subtitle blocks in small region units, but cannot detect them in smaller units, i.e., in pixel units.

The invention of Jpn. Pat. Appln. KOKAI Publication No. 2009-017325 also makes detection in pixel units in extraction of a character string rectangular region (subtitle region) (see paragraphs 0018, 0019, 0030, and 0033). However, Jpn. Pat. Appln. KOKAI Publication No. 2009-017325 does not check any change of a subtitle region between neighboring frames, and is not sufficient as a detection method of a still subtitle included in a video picture (movie).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

In the following description the term "unit" may broadly indicate a single, distinct part or object, especially one used for a specific purpose. Or, the term "unit" may indicate any fixed quantity, amount, distance, measure, etc. Note that the meaning of the "unit" may be changed by the attached labeling word(s), e.g., a "small region unit" differs in meaning from a "pixel unit."

Figure 1:
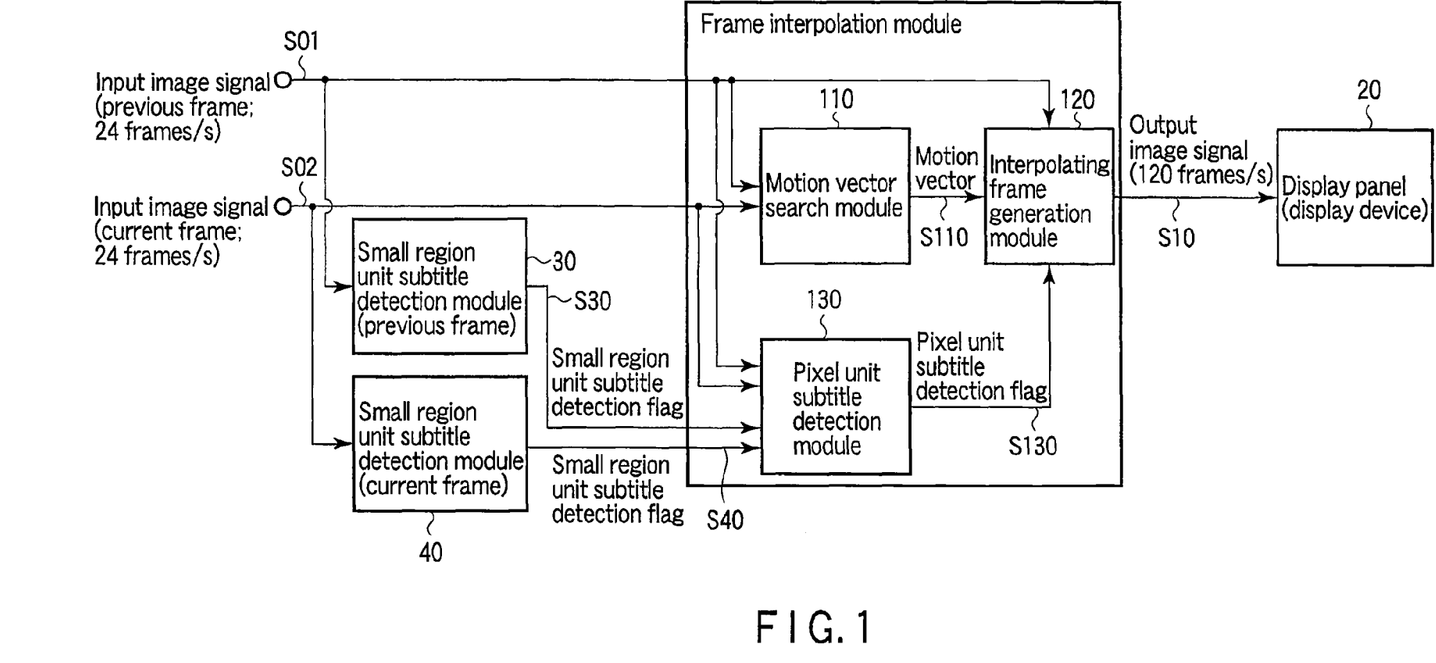
FIG. 1 is an exemplary block diagram for explaining an interpolating frame generation apparatus including a still subtitle detection apparatus according to an embodiment of the invention.

In general, according to an embodiment of the invention, a still subtitle detection apparatus detects, in pixel units or in a pixel unit, a subtitle part included in an image in a video frame defined by a plurality of pixels (cf. a still subtitle detection apparatus including pixel unit subtitle detection module 130 shown in FIG. 1). This apparatus includes a subtitle part determination module (edge detection modules 133 and 135, and edge neighboring white peak region detection modules 134 and 136 in FIG. 2), and a still subtitle detection module (still determination module 131 and pixel unit still subtitle detection module 132 in FIG. 2).

The subtitle part determination module determines, as a subtitle part, a pixel or pixel group on the high-luminance region side (white peak region side) that neighbors the detection position of an image edge (a border of a character) where a luminance level changes or on the low-luminance region side (black bottom region side) that neighbors the detection position of an image edge (a border of a character) where a luminance level changes. (More specifically, for example, on the former white peak region side, a subtitle part including white characters on a black background is determined, and on the latter black bottom region side, a subtitle part including black characters on a white background is determined.)

Figure 8:
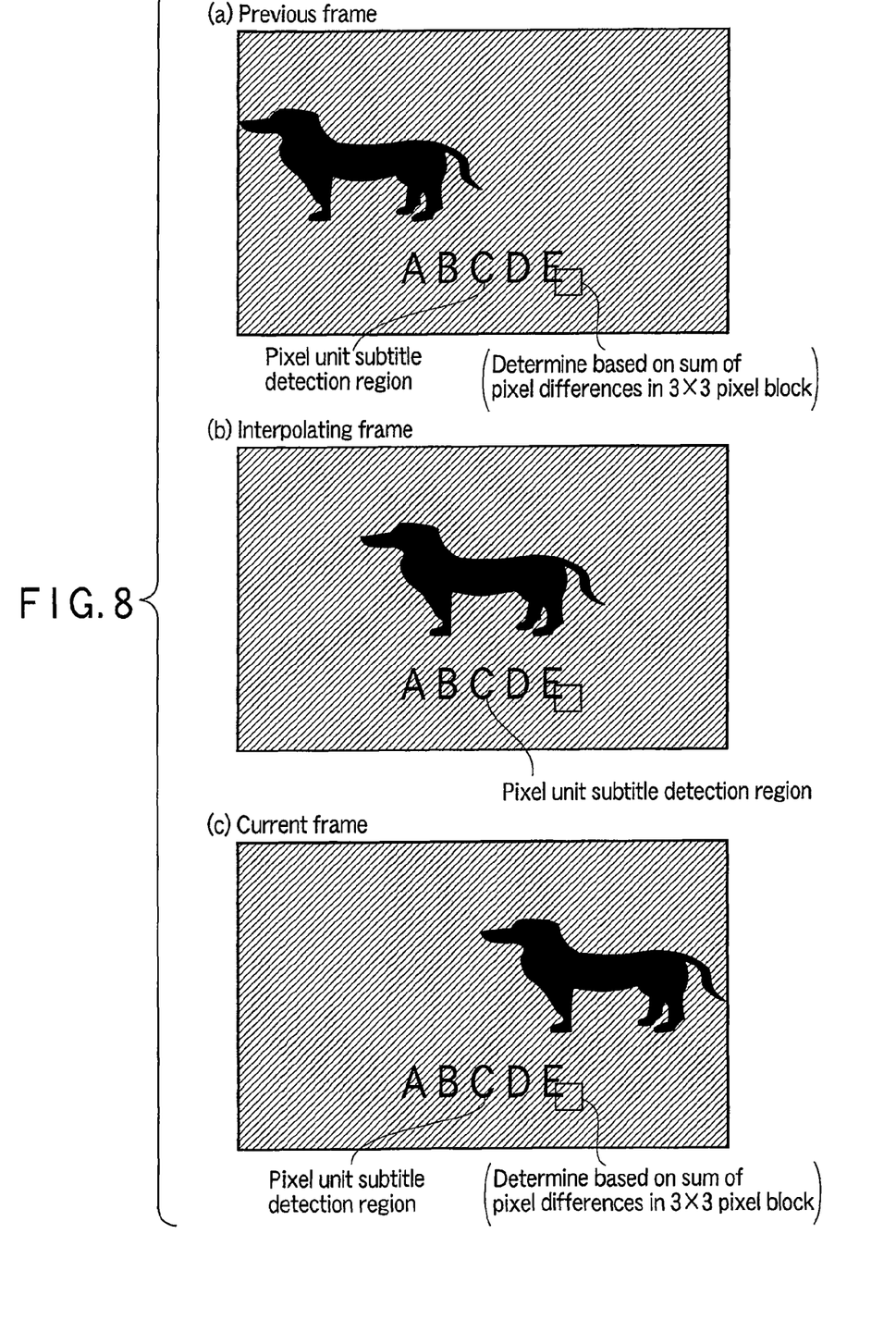
FIG. 8 is a view for explaining an example of still determination and interpolating frame generation based on the pixel unit subtitle region detection result.

The still subtitle detection module detects the subtitle part as a still subtitle, when it is detected that the subtitle part remains unchanged by comparing two continuous video frames along the time axis (for example, the previous frame and current frame in FIG. 8).

When the invention is reduced to practice, high-quality still subtitle detection in pixel units can be implemented.

Various embodiments of the invention will be described hereinafter with reference to the drawings. FIG. 1 is a block diagram for explaining an interpolating frame generation apparatus including a still subtitle detection apparatus according to an embodiment of the invention. Frame interpolation module 10, constituting the interpolating frame generation apparatus, detects in pixel units a subtitle part included in an image of a video frame defined by a plurality of pixels, and includes motion vector search module 110, interpolating frame generation module 120, and pixel unit subtitle detection module 130.

The subtitle part is included in, for example, a digital video signal obtained by decoding a data stream which is encoded by MPEG-2 or H.264/AVC. This digital video signal corresponds to input image signals S01 and S02 in FIG. 1. Input image signals S01 and S02 include a plurality of video frames which are continuous along the time axis. These video frames have a first frame rate (24 frames/s), and include a previous frame (S01) and current frame (S02) which are continuous or neighboring on the time axis. Motion vector search module 110 detects motion vectors (x- and y-direction vectors on an x-y plane of a two-dimensional frame) of an input image from the previous frame (S01) and current frame (S02) in the input image signal. Such a motion vector detection is known in a certain technical field. In the technical field, for example, a block having a small sum of pixel difference values (SAD: Sum of Absolute Differences) is detected as a block having a highest similarity by a block matching method using neighboring frames, and the detected block is determined for the vector.

Detection result S110 of motion vectors and image information of the previous frame (S01) are input to interpolating frame generation module 120. Interpolating frame generation module 120 further receives pixel unit subtitle detection flag S130 from pixel unit subtitle detection module 130. This pixel unit subtitle detection flag S130 is obtained as follows.

That is, the apparatus shown in FIG. 1 further includes small region unit subtitle detection module 30 for the previous frame and small region unit subtitle detection module 40 for the current frame. Small region unit subtitle detection module 30 for the previous frame divides the input previous frame (S01) into small regions, and detects the subtitle part in these small region units. If the subtitle part is detected, small region unit subtitle detection module 30 for the previous frame outputs small region unit subtitle detection flag S30. Also, small region unit subtitle detection module 40 for the current frame divides the input current frame (S02) into small regions, and detects the subtitle part in these small region units. If the subtitle part is detected, the small region unit subtitle detection module 40 for the current frame outputs small region unit subtitle detection flag S40.

Note that each of small region unit subtitle detection module 30 for the previous frame and small region unit subtitle detection module 40 for the current frame can be embodied by the arrangement shown in FIG. 1 of Jpn. Pat. Appln. KOKAI Publication No. 2008-252561 described above. This KOKAI Publication No. 2008-252561 may be referred to for details about small region unit subtitle detection.

Small region unit subtitle detection flag S30 from small region unit subtitle detection module 30 for the previous frame and small region unit subtitle detection flag S40 from small region unit subtitle detection module 40 for the current frame are input to pixel unit subtitle detection module 130. This pixel unit subtitle detection module 130 also receives the previous frame (S01) and current frame (S02) of input image signals S01 and S02. Pixel unit subtitle detection module 130 is one of principal modules of the still subtitle detection apparatus according to the embodiment of the invention, and has the arrangement to be described below.

Figure 2:
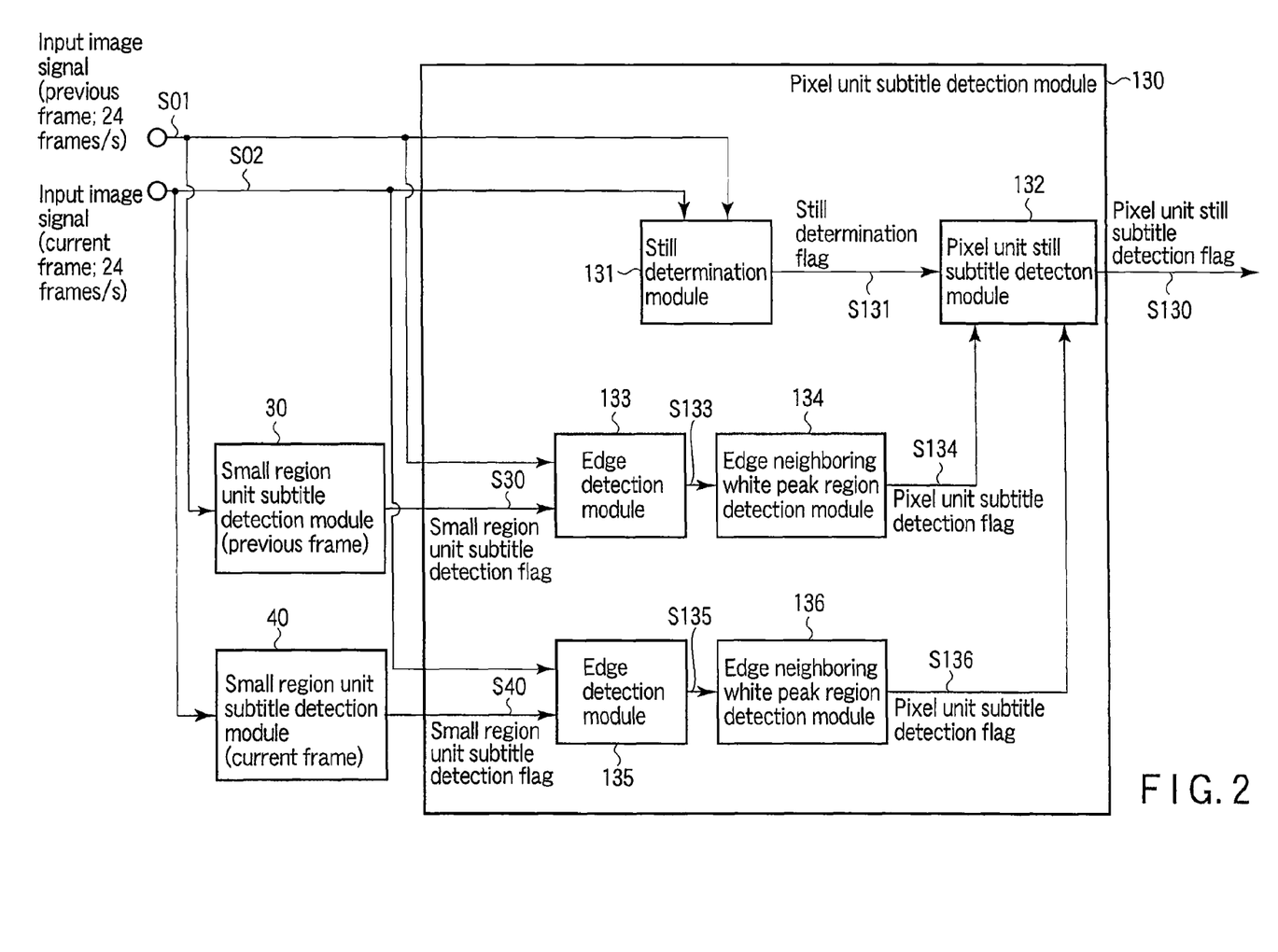
FIG. 2 is an exemplary block diagram for explaining an example of the arrangement of a pixel unit subtitle detection module.

FIG. 2 is a block diagram showing an example of the arrangement of pixel unit subtitle detection module 130. A case will be exemplified below wherein a subtitle is defined by relatively high-luminance character shapes (white characters) superimposed on a relatively low-luminance image (black background).

The previous frame (S01) of the input image signal and small region unit subtitle detection flag S30 from small region unit subtitle detection module 30 for the previous frame are input to edge detection module 133. Edge detection result S133 by edge detection module 133 is input to edge neighboring white peak region detection module 134.

Figure 4:
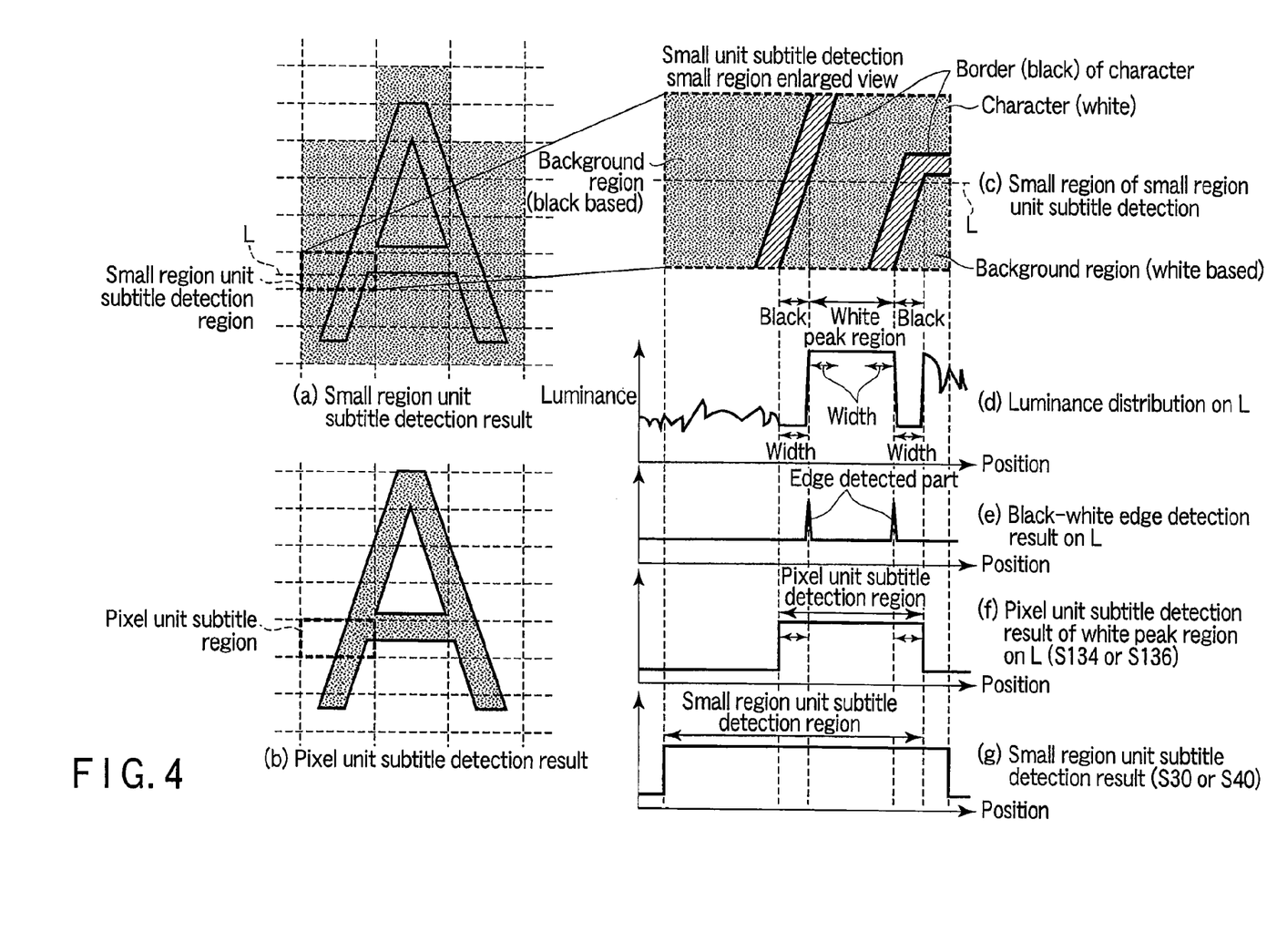
FIG. 4 is an exemplary view for explaining an example of pixel unit subtitle region detection.

Assume that an image of the previous frame input to edge detection module 133 includes white character "A" shown by, e.g., (a) in FIG. 4, small region unit subtitle detection flag S30 indicates a small region unit subtitle detection region of a range shown by, e.g., (g) in FIG. 4, and a "part of white character A" shown by, e.g., (c) in FIG. 4 is included in this small region unit subtitle detection region. In this case, edge detection module 133 detects a luminance level distribution ((d) in FIG. 4) of a pixel group on one horizontal line (line of interest) L in a video frame including the small region unit subtitle detection region.

In the example shown by (d) in FIG. 4, when the detection position enters one border of white character A from a black-based background region, the luminance level temporarily lowers. When the detection position enters a body part (a character line part which forms character A and includes a plurality of pixels) of white character A beyond the border, the luminance level abruptly rises to the high-luminance side (white peak). When the detection position enters the other border of white character A beyond the body part of white character A, the luminance level abruptly drops to the low-luminance side (black bottom). When the detection position crosses over the other border, the luminance level resumes that of the black-based background region.

When the aforementioned luminance level change is detected on line of interest L, edge detection result S133 indicating this luminance level change is input to edge neighboring white peak region detection module 134. Edge neighboring white peak region detection module 134 differentiates the luminance level abrupt change parts at the right and left edges of a character line (on line L and having a width for a plurality of pixels) of white character A, and detects the edges of white character A in pixel units ((e) in FIG. 4). Also, edge neighboring white peak region detection module 134 defines a subtitle detection region in pixel units to include black character borders at the right and left sides of the detected edges of white character A ((f) in FIG. 4). Edge neighboring white peak region detection module 134 outputs the detection result ((f) in FIG. 4) of white character A including up to the character borders as pixel unit subtitle detection flag S134 of the previous frame (S01).

By collecting the detection result of white character A (corresponding to pixel unit subtitle detection flag S134) over the whole small region unit subtitle detection region shown by (a) in FIG. 4, a pixel unit subtitle detection result shown by (b) in FIG. 4 is obtained in correspondence with the previous frame (S01). (This detection result is temporarily stored in a memory (not shown) connected to or incorporated in pixel unit subtitle detection module 130.)

Likewise, the current frame (S02) of the input image signal and small region unit subtitle detection flag S40 from small region unit subtitle detection module 40 for the current frame are input to edge detection module 135. Edge detection result S135 by edge detection module 135 is input to edge neighboring white peak region detection module 136. Edge neighboring white peak region detection module 136 outputs the detection result of white character A including up to the character borders as pixel unit subtitle detection flag S136 of the current frame (S02). By collecting the detection result of white character A (corresponding to pixel unit subtitle detection flag S136) over the whole small region unit subtitle detection region shown by (a) in FIG. 4, a pixel unit subtitle detection result shown by (b) in FIG. 4 is obtained in correspondence with the current frame (S02). (This detection result is also temporarily stored in a memory (not shown) connected to or incorporated in pixel unit subtitle detection module 130.)

The previous frame (S01) and current frame (S02) of input image signals S01 and S02 are input to still determination module 131. Still determination module 131 checks whether or not the subtitle part has changed between the previous frame (S01) and current frame (S02) (between two neighboring frames). In this checking process, for example, when the sum of luminance level differences of corresponding pixels between the two neighboring frames in a small pixel block (like 1×1 to 4×4 pixel blocks) is equal to or smaller than a predetermined threshold, still determination module 131 determines no change in that block. When no change is detected, still determination module 131 outputs still determination flag S131. This still determination flag S131, pixel unit subtitle detection flag S134 from edge neighboring white peak region detection module 134, and pixel unit subtitle detection flag S136 from edge neighboring white peak region detection module 136 are input to pixel unit still subtitle detection module 132.

Pixel unit still subtitle detection module 132 compares pixel unit subtitle detection flag S134 of the previous frame with pixel unit subtitle detection flag S136 of the current frame in association with frames in which it is detected based on still determination flag S131 that the subtitle part remains unchanged between two frames which are continuous along the time axis (between the previous frame and current frame). If pixel unit subtitle detection flag S134 of the previous frame matches pixel unit subtitle detection flag S136 of the current frame, pixel unit still subtitle detection module 132 determines that the subtitle in the previous frame (S01) and that in the current frame (S02) remain still. In this case, pixel unit still subtitle detection module 132 outputs pixel unit still subtitle detection flag S130. This flag S130 is input to interpolating frame generation module 120 in FIG. 1 as pixel unit subtitle detection flag S130 described above.

Interpolating frame generation module 120 in FIG. 1 generates interpolating frames including a still picture subtitle at a second frame rate (120 frames/s) higher than the first frame rate (24 frames/s) of input image signals S01 and S02. Interpolating frame generation module 120 inserts a predetermined number of interpolating frames between the neighboring frames of the input image signal, thereby converting the input image signal into output image signal S10 of the high frame rate. This output image signal S10 is displayed on high-resolution display panel (display device) 20.

Note that when pixel unit still subtitle detection flag S130 is set (when a subtitle included in the current frame is a still subtitle), interpolating frame generation module 120 generates interpolating frames using zero vectors without using motion vectors S110 calculated by motion vector search module 110 in association with pixels detected as a subtitle. Then, even when the background of a subtitle included in interpolating frames is in motion, an easy-to-see subtitle in which the characters themselves of the subtitle part included in the interpolating frames stably remain still without any disturbance can be displayed.

The functions of pixel unit subtitle detection module 130 shown in FIG. 2 are summarized as follows. That is, for example, since a still subtitle of a movie normally includes black-bordered white characters, edge detection modules 133 and 135 detect boundaries (edges) between black of borders and white of characters of the still subtitle ((e) in FIG. 4). Then, edge neighboring white peak region detection modules 134 and 136 generate pixel unit subtitle detection flags ((f) in FIG. 4) to have regions on the white peak region sides ((d) in FIG. 4) of the detected edges as white character regions ((c) in FIG. 4) of the subtitle. Generated pixel unit subtitle detection flags S134 and S136 are output to pixel unit still subtitle detection module 132. Pixel unit still subtitle detection module 132 determines pixels of the subtitle region, in which still determination flag S131 generated by still determination between the two neighboring frames is set, as those of the still subtitle, and generates still subtitle detection flag S130.

In the example shown by (a) in FIG. 4, all small regions including white character A are detected as the still subtitle. The sequence of processes until the subtitle detection result in pixel units shown by (b) in FIG. 4 is obtained from subtitle-detected small regions as shown by (a) in FIG. 4 will be briefly summarized below. The luminance distribution on small region subtitle detection line L shown by (c) in FIG. 4 is as exemplified by (d) in FIG. 4. The edges between white and black are detected from this luminance distribution, as shown by (e) in FIG. 4. When white and black levels exist to have a certain width (a plurality of pixels) or more from the edge boundaries, a white peak region is detected as a subtitle region, as shown by (f) in FIG. 4.

In the above description, the "case in which the subtitle includes relatively high-luminance character shapes (white characters) superimposed on a relatively low-luminance image (black background)" has been exemplified. Also, the same applies to a case in which the black and white levels of a picture signal or image signal including a subtitle are reversed (for example, in case of a negative film image with respect to a positive film image). That is, the same processes apply to a "case in which a subtitle includes relatively low-luminance character shapes (black characters) superimposed on a relatively high-luminance image (white background)". In this case, "white" and "black" in the above description can be read as "black" and "white" as needed.

Figure 3:
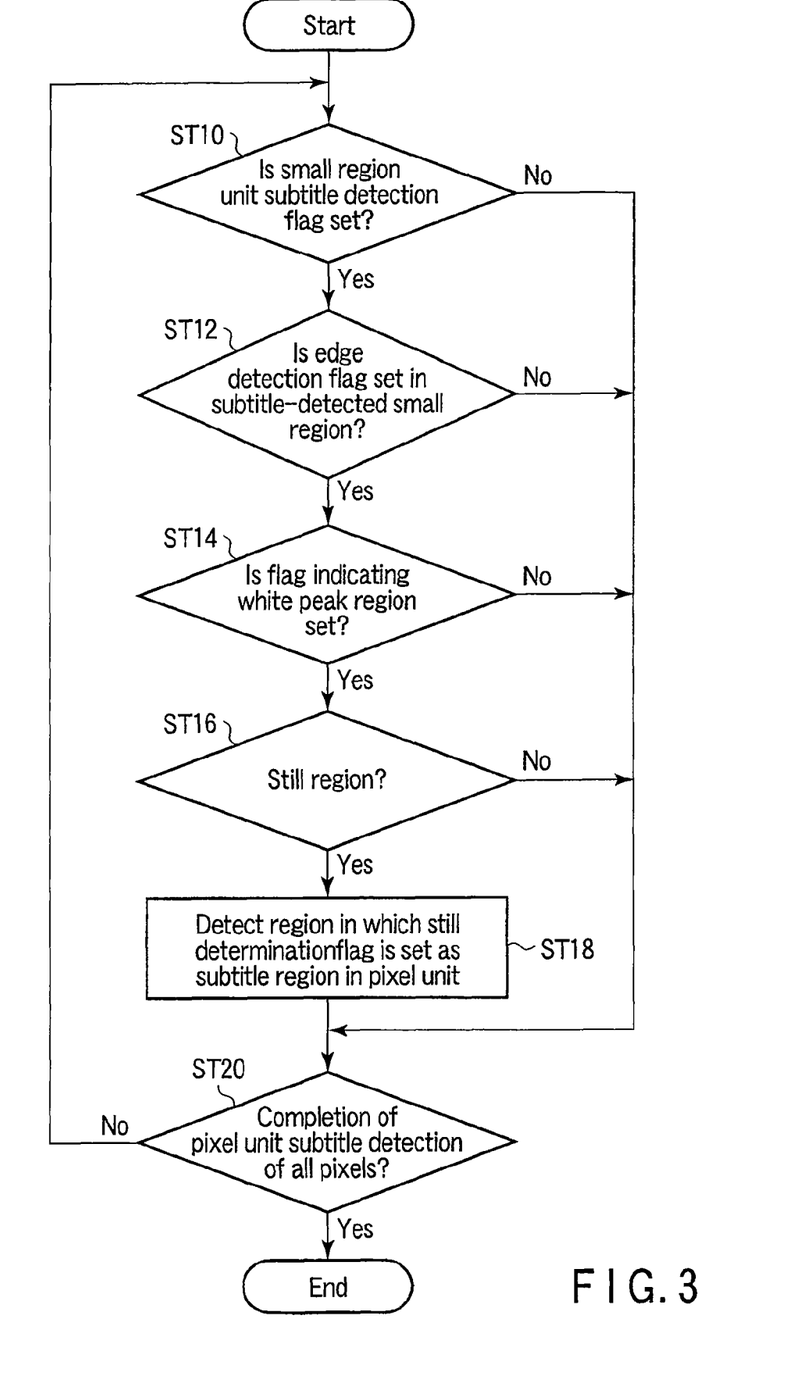
FIG. 3 is an exemplary flowchart for explaining an example of still subtitle detection processing.

FIG. 3 is a flowchart for explaining an example of the still subtitle detection processing in pixel unit subtitle detection module 130 shown in FIG. 2. In the first small region unit of a video frame divided into small region units (pixel block units), it is checked if small region unit subtitle detection flag S30 or S40 is set (ST10). If the flag is not set (NO in ST10), and if the checking process of that frame as a whole is not complete yet (NO in ST20), it is checked in the next small region unit if small region unit subtitle detection flag S30 or S40 is set (ST10).

If small region unit subtitle detection flag S30 or S40 is set (YES in ST10), it is checked in that subtitle-detected small region if edge detection flag S133 or S135 is set (ST12). If the flag is not set (NO in ST12) and if the checking process of that frame as a whole is not complete yet (NO in ST20), it is checked in the next small region unit if small region unit subtitle detection flag S30 or S40 is set (ST10), and it is subsequently checked in the subtitle-detected small region if edge detection flag S133 or S135 is set (ST12).

If edge detection flag S133 or S135 is set (YES in ST12), it is checked if pixel unit subtitle detection flag S134 or S136 indicating a white peak region of a white character is set (ST14). If the flag is not set (NO in ST14) and if the checking process of that frame as a whole is not complete yet (NO in ST20), it is checked in the next small region unit if small region unit subtitle detection flag S30 or S40 is set (ST10), it is subsequently checked in the subtitle-detected small region if edge detection flag S133 or S135 is set (ST12), and it is then checked if pixel unit subtitle detection flag S134 or S136 is set (ST14).

If pixel unit subtitle detection flag S134 or S136 is set (YES in ST14), it is checked with reference to still determination flag S131 if the subtitle-detected region is located in a still region (ST16). If the subtitle-detected region is not located in a still region (for example, when a subtitle is moving or the contents of the subtitle is changing) (NO in ST16), and if the checking process of that frame as a whole is not complete yet (NO in ST20), the processes in ST10 to ST16 are executed again.

If the subtitle-detected region is located in a still region (YES in ST16), a region where still determination flag S131 is set is detected as a "pixel unit subtitle region" (ST18). If this region is detected, pixel unit subtitle detection flag S130 in FIG. 1 or pixel unit still subtitle detection flag S130 shown in FIG. 2 is set.

When the "pixel unit subtitle region" is detected somewhere in a certain video frame (flag S130 is set), it is determined that the frame includes a still subtitle which can be detected in pixel units, and the processing sequence ends (YES in ST20). If no "pixel unit subtitle region" is detected through a certain video frame as a whole, it is determined that the frame does not include any still subtitle which can be detected in pixel units, and the processing sequence ends (YES in ST20). The processing result (whether or not flag S130 is set) in FIG. 3 is referred to in interpolating frame generation by interpolating frame generation module 120 shown in FIG. 1.

Figure 9:
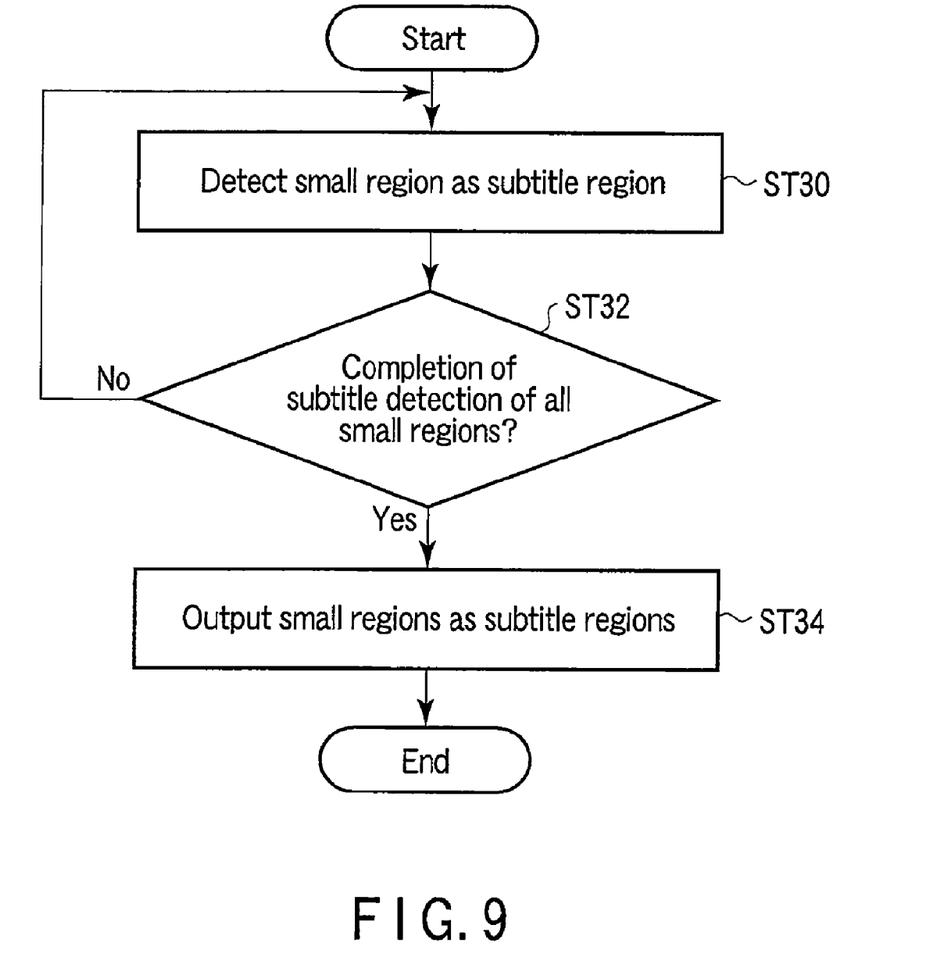
FIG. 9 is an exemplary flowchart for explaining small region unit subtitle region detection processing.

FIG. 9 is a flowchart for explaining an example of the small region unit subtitle region detection processing. In an image (including various spatial frequency components) of a certain frame, a specific small region is detected as a subtitle region (ST30). Note that the specific small region can be detected as a pixel block which simultaneously satisfies three conditions: (1) the number of pixels having large high-spatial frequency components is equal to or larger than a predetermined value, (2) a dynamic range from a low luminance to a high luminance exceeds a predetermined threshold, and (3) the number of high-luminance pixels is equal to or larger than a predetermined value. This detection is made over the entire frame. Upon completion of detection of all small regions in that frame (YES in ST32), the detected small regions are output as subtitle regions (ST34).

Figure 10:
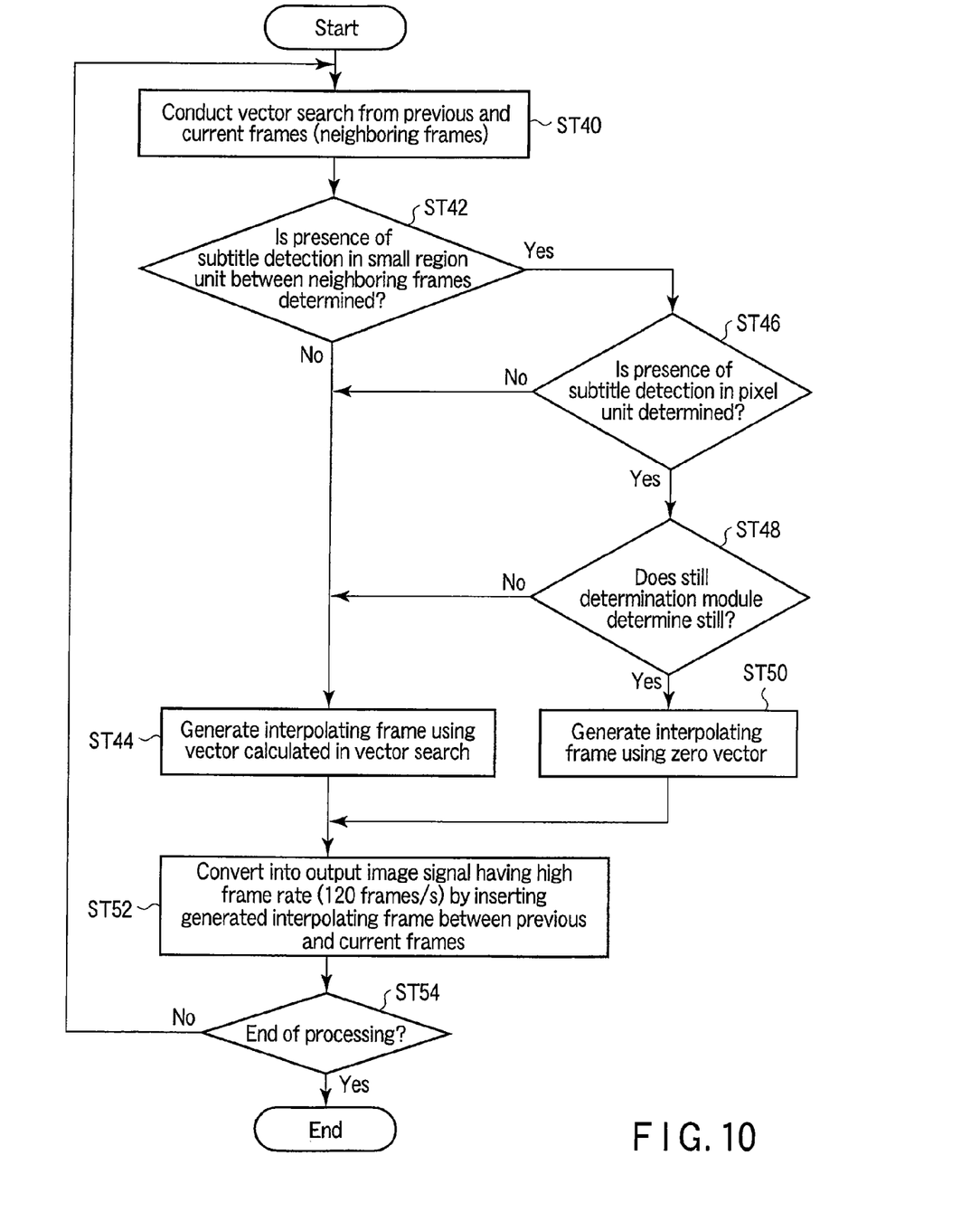
FIG. 10 is an exemplary flowchart for explaining an example of interpolating frame generation processing.

FIG. 10 is a flowchart for explaining an example of the interpolating frame generation processing. A vector search is conducted from the previous frame and current frame which are continuous along the time axis (neighboring frames) (ST40). Motion vector search module 110 in FIG. 1 can conduct this vector search. Upon completion of the vector search, it is checked if the subtitle detection in small region units is achieved in the neighboring frames (ST42). If subtitle regions are not output in the processing shown in FIG. 9 (ST34), it is determined that the subtitle detection is not achieved (NO in ST42). In this case, interpolating frames having a rate of 120 frames/s are generated based on vectors calculated in the vector search (ST44). The plurality of generated interpolating frames having the rate of 120 frames/s are inserted between the previous frame and current frame having the rate of 24 frames/s. In this manner, the input image signal having the rate of 24 frames/s is converted into an output image signal having the rate of 120 frames/s (ST52).

During execution of this frame conversion processing, if it is determined that the subtitle detection in small region units is achieved (YES in ST42), it is checked if the subtitle detection in pixel units is achieved (ST46). If the subtitle detection in pixel units (ST18) is not achieved in the processing shown in FIG. 3 (NO in ST46), interpolating frames having the rate of 120 frames/s are generated based on vectors calculated in the vector search (ST44). If the subtitle detection in pixel units is achieved (YES in ST46), still determination module 131 in FIG. 2 checks if the subtitle remains still (ST48). If the subtitle does not remain still (still determination flag S131 is not set) (NO in ST48), interpolating frames having the rate of 120 frames/s are generated based on vectors calculated in the vector search (ST44).

If the subtitle remains still (still determination flag S131 is set) (YES in ST48), interpolating frames having the rate of 120 frames/s are generated using zero vectors as motion vectors of the subtitle region (ST50). The plurality of interpolating frames having the rate of 120 frames/s, which are generated to use zero vectors as motion vectors of the subtitle region, are inserted between the previous frame and current frame having the rate of 24 frames/s. In this way, the input image signal (including a still picture subtitle) having the rate of 24 frames/s is converted into an output image signal (including a still picture subtitle) having the rate of 120 frames/s (ST52).

The aforementioned processing is repeated while the output image signal converted into the high frame rate is generated (NO in ST54). If the input image signal is switched to a signal without any subtitle or if the interpolating frame generation processing is complete (YES in ST54), the processing sequence in FIG. 10 ends.

Figure 5:
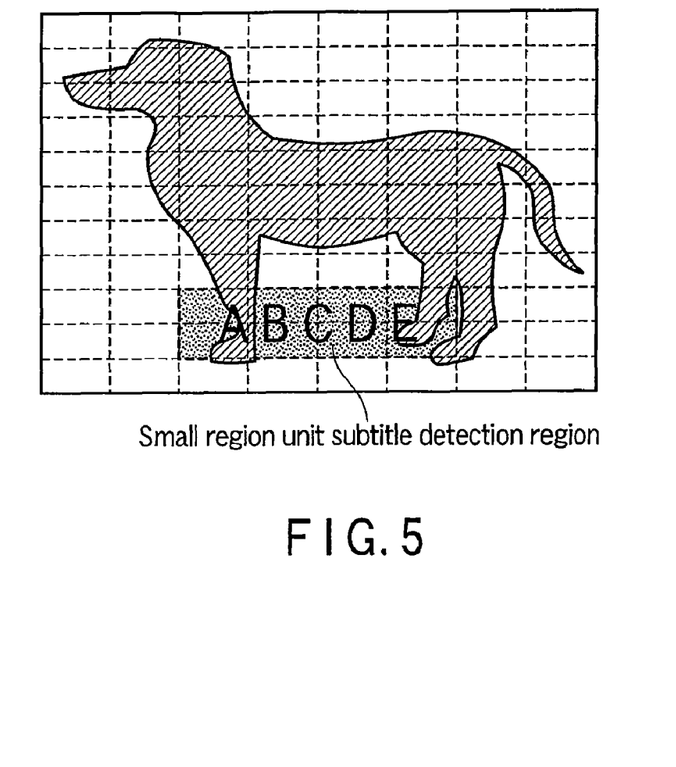
FIG. 5 is an exemplary view for explaining an example of a small region unit subtitle region detection result.
Figure 6:
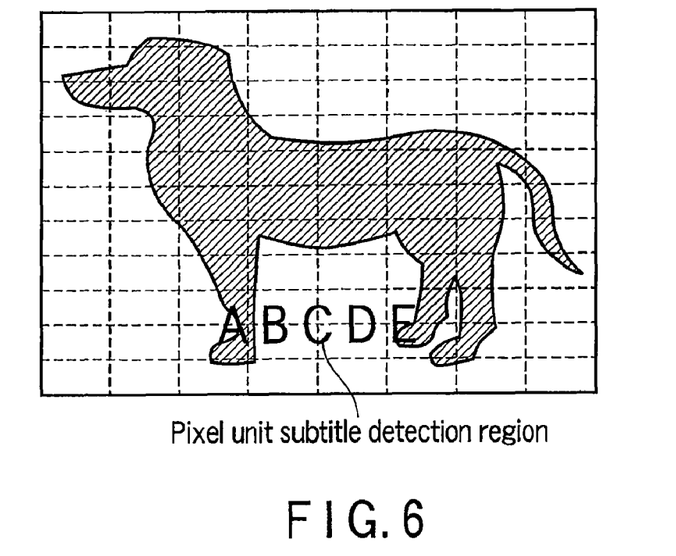
FIG. 6 is an exemplary view for explaining an example of a pixel unit subtitle region detection result.

FIG. 5 shows an example of a small region unit subtitle region detection result, and FIG. 6 shows an example of a pixel unit subtitle region detection result. When only subtitle region detection ends at small region units, the degree of disturbance of the area of the subtitle part against the background image is large, as shown in FIG. 5. However, when subtitle region detection up to pixel units can be made, the area of the subtitle part is reduced, and does not so disturb the background image, as shown in FIG. 6. Even in this state, high clearness of the subtitle is maintained. That is, when the subtitle region detection in pixel units is made, as shown in FIG. 6, a high-quality subtitle can be flexibly displayed.

Figure 7:
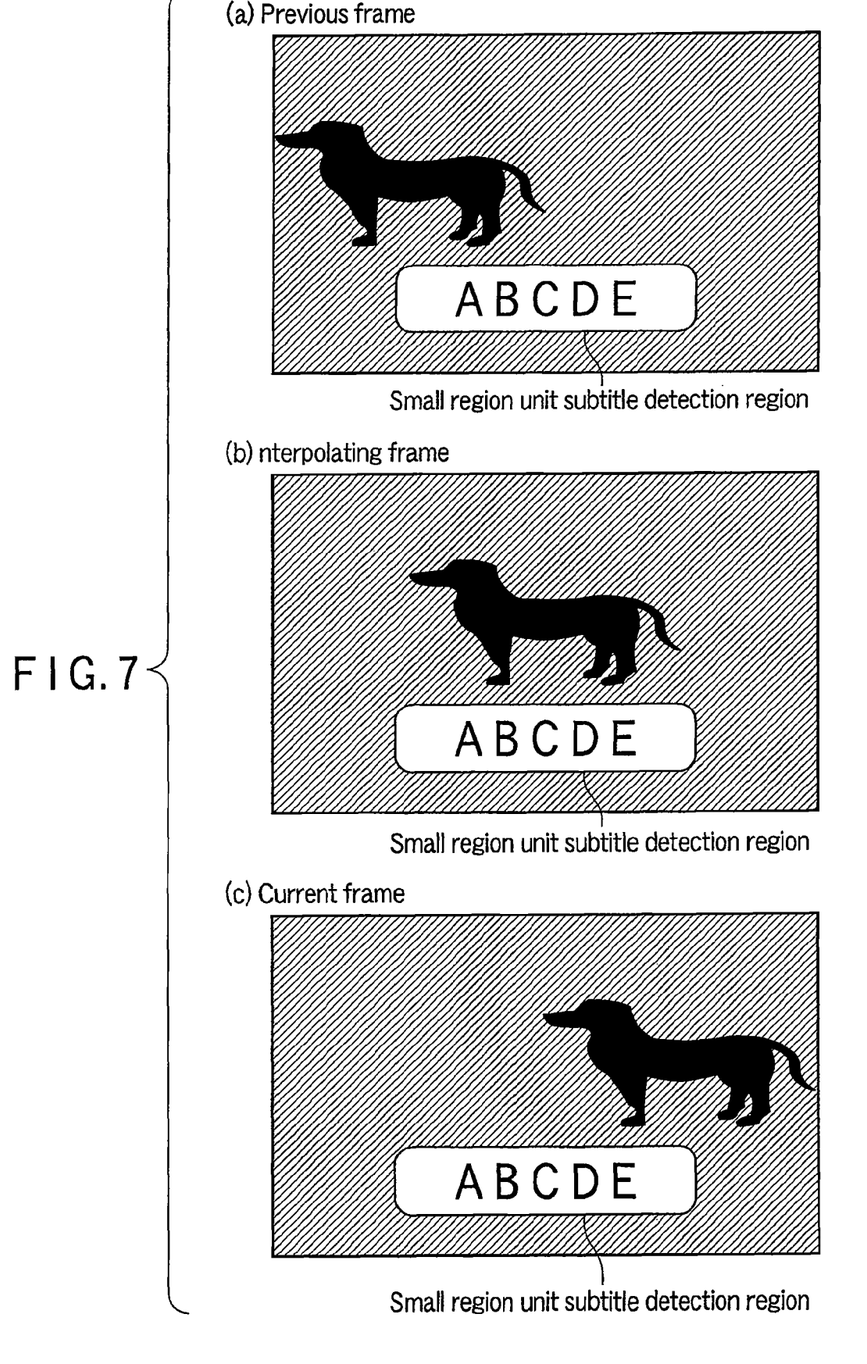
FIG. 7 is a view for explaining an example of still determination and interpolating frame generation based on the small region unit subtitle region detection result.

FIG. 7 is a view for explaining an example of still determination and interpolating frame generation based on the small region unit subtitle region detection result. FIG. 8 is a view for explaining an example of still determination and interpolating frame generation based on the pixel unit subtitle region detection result. In the example in FIG. 8, whether or not the neighboring frames remain still is detected to have, as the center, pixels from which subtitle regions are detected in pixel units. For example, when the sum of pixel differences in a small block like a 3×3 pixel block is small, it is determined that the frames remain still. Also, still determination can be made based on differences for respective pixels in place of blocks.

If subtitle detection in pixel units cannot be achieved in the processing shown in FIG. 10, a plurality of interpolating frames including a subtitle are inserted between the previous frame ((a) in FIG. 7) and the current frame ((c) in FIG. 7), as shown by (b) in FIG. 7. On the other hand, if subtitle detection in pixel units can be achieved in the processing shown in FIG. 10, a plurality of interpolating frames including a subtitle are inserted between the previous frame ((a) in FIG. 8) and the current frame ((c) in FIG. 8), as shown by (b) in FIG. 8. When zero vectors are used as the motion vectors of the still picture subtitle regions, the subtitle stably remains still without being disturbed even when the background (an image of a dog in this example) is moving.

As described above, subtitle detection can be processed by edge determination, white peak region detection, still determination, and the like in pixel units still smaller than pixel blocks. In this way, high-quality still subtitle interpolation can be implemented.

Effects of Embodiment

Upon practicing the invention, a still subtitle part included as a part of a picture or image in a video signal can be detected in pixel units.

For example, in a film dejudder that reduces any judder of a telecine picture, by detecting a character part in pixel units from pixel blocks of subtitle regions, a part around each character of the subtitle can be detected more finely, and interpolating frames with higher precision can be generated for the subtitle part. That is, by executing processing for detecting a subtitle in pixel units, the subtitle region detection precision can be improved, and interpolating frames with higher quality can be generated in a still subtitle.

Note that upon practicing the invention, a "still subtitle" means a subtitle which does not change across a plurality of frames. For example, when a subtitle of a certain frame remains unchanged in the next frame, that subtitle is a still subtitle in association with these plurality of frames. When a subtitle which was a still subtitle between a plurality of certain frames changes to another subtitle in a frame later, and the subtitle after change remains unchanged across a plurality of frames, that subtitle after change is also a still subtitle.

Summary of Embodiment

1. In an apparatus or method, which detects features of a subtitle in small regions obtained by dividing a video frame, and detects small regions as the subtitle, when the number of pixels determined as high-luminance pixels exceeds an arbitrary threshold in each of small regions included in an arbitrary range near the small regions detected as the subtitle, that small region is processed as a subtitle region. Furthermore, when the number of pixels determined as low-luminance pixels exceeds an arbitrary threshold for each of small regions included in an arbitrary range near the small regions detected as the subtitle and small regions determined as subtitle regions by the aforementioned processing, that small region is processed as a subtitle region. In this manner, in a subtitle block detected as a subtitle region for each small region, a part on the white peak region side of a change point from black to white which neighbors the black-white edge detection position is determined as a subtitle, and a part in which the subtitle part is determined as a still part based on neighboring frames is determined as a still subtitle.

2. In frame interpolation processing, a region determined as a still subtitle in a frame is set to use zero vectors.

Correspondence Example Between Embodiment and Invention (a) Visual equipment according to an embodiment of the invention includes a subtitle part determination module, still subtitle detection module, motion vector detection module (or motion vector search module), interpolating frame generation module (or interpolating frame insertion module), and display module.

When the source of an image in a video frame including a plurality of pixels is an input image signal, the subtitle part determination module (133-136 in FIG. 2) detects a subtitle part included in this input image signal in pixel units, and determines, as a subtitle part, a pixel or pixel group on the high-luminance region side that neighbors the detection position of an image edge where a luminance level changes or on the low-luminance region side that neighbors the detection position of an image edge where a luminance level changes.

The still subtitle detection module (131, 132 in FIG. 2) compares the previous frame and current frame, which correspond to the video frame and are continuous along the time axis. When it is detected that the subtitle part remains unchanged, the still subtitle detection module detects that subtitle part as a still subtitle.

The motion vector detection module (110 in FIG. 1) detects motion vectors of an input image included in the input image signal having a first frame rate (24 frames/s) from the previous frame and current frame.

The interpolating frame generation module (120 in FIG. 1) generates interpolating frames having a second frame rate (120 frames/s) higher than the first frame rate (24 frames/s) based on the motion vector detection result (S110) by the motion vector detection module (110) or the still subtitle detection result (S130) by the still subtitle detection module (131, 132) (ST44 or ST50 in FIG. 10). By inserting the interpolating frames between the previous frame and current frame, the input image signal (S01, S02) is converted into an output image signal having the second frame rate (120 frames/s).

The display module (20 in FIG. 1) displays the output image signal (S10) from the interpolating frame generation module (120).

(b) As for the subtitle part detected as the still subtitle by the still subtitle detection module (131, 132), the interpolating frames are generated to use zero vectors as motion vectors of that subtitle part without using the motion vector detection result by the motion vector detection module (110) (ST46-ST50 in FIG. 10).

(c) The subtitle part determination module (edge detection modules 133 and 135 and edge neighboring white peak region detection modules 134 and 136 in FIG. 2) includes a previous frame edge detection module (133) and previous frame edge neighboring peak region detection module (134). The previous frame edge detection module (133) detects a luminance level change in a luminance level distribution ((d) in FIG. 4) of a pixel group which exists on one horizontal line (line of interest L) in the video frame, and inputs a previous frame edge detection result (S133) indicating this luminance level change to the previous frame edge neighboring peak region detection module (134). The previous frame edge neighboring peak region detection module (134) detects, in pixel units, an edge of a character (A) of the subtitle part in the previous frame from the previous frame edge detection result (S133) ((e) in FIG. 4).

(d) The subtitle part determination module (edge detection modules 133 and 135 and edge neighboring white peak region detection modules 134 and 136 in FIG. 2) includes a current frame edge detection module (135) and current frame edge neighboring peak region detection module (136). The current frame edge detection module (135) detects a luminance level change in a luminance level distribution ((d) in FIG. 4) of a pixel group which exists on one horizontal line (line of interest L) in the video frame, and inputs a current frame edge detection result (S135) indicating this luminance level change to the current frame edge neighboring peak region detection module (136). The current frame edge neighboring peak region detection module (136) detects, in pixel units, an edge of a character (A) of the subtitle part in the current frame from the current frame edge detection result (S135) ((e) in FIG. 4).

(e) An image processing method according to the embodiment of the invention, includes:

determining, when the source of an image in a video frame including a plurality of pixels is an input image signal, as a subtitle part, a pixel or pixel group on the high-luminance region side that neighbors the detection position of an image edge where a luminance level changes or on the low-luminance region side that neighbors the detection position of an image edge where a luminance level changes upon detection of a subtitle part included in the input image signal in pixel units (YES in ST10—YES in ST14 in FIG. 3; YES in ST42—YES in ST46 in FIG. 10);

detecting, when it is detected by comparing the previous frame and current frame, which correspond to the video frame and are continuous along the time axis, that the subtitle part remains unchanged, that subtitle part as a still subtitle (YES in ST16, ST18 in FIG. 3; YES in ST48 in FIG. 10);

detecting motion vectors of an input image included in the input image signal having a first frame rate (24 frames/s) from the previous frame and current frame (ST40 in FIG. 10); and generating interpolating frames having a second frame rate (120 frames/s) higher than the first frame rate (24 frames/s) based on the motion vector detection result (S110) or the still subtitle detection result (S130) (ST44 or ST50 in FIG. 10), and converting the input image signal (S01, S02) into an output image signal (S10) having the second frame rate (120 frames/s) by inserting the interpolating frames between the previous frame and current frame (ST52 in FIG. 10).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modification as would fall within the scope and spirit of the inventions.

What is claimed is:

1. A still subtitle detection apparatus configured to detect in pixel units or in a pixel unit a subtitle part included in an image in one video frame including a plurality of pixels, the apparatus comprising:
    a subtitle part determination module configured to determine within the one video frame, as the subtitle part, a pixel or a pixel group
        on a first luminance region side that neighbors a detection position of an image edge where a first luminance level changes, or
        on a second luminance region side that neighbors a detection position of an image edge where a second luminance level changes, the second luminance level being lower than the first luminance level;
    a still subtitle detection module configured to detect the subtitle part as a still subtitle by comparing two video frames and determining that the subtitle part remains unchanged in the two video frames, the two video frames being continuous along a time axis, wherein an input image signal including the subtitle part includes a previous frame and a current frame having a first frame rate; and
    a frame interpolation module configured to convert the input image signal into an output image signal having a second frame rate higher than the first frame rate, the frame interpolation module including
        a motion vector detection module configured to detect a motion vector of an input image from the previous frame and the current frame of the input image signal, and
        an interpolating frame insertion module configured to insert an interpolating frame having the second frame rate between the previous frame and the current frame, and the interpolating frame insertion module is configured to generate the interpolating frame based on a motion vector detection result by the motion vector detection module or a still subtitle detection result by the still subtitle detection module,
    wherein the subtitle part determination module includes a previous frame edge detection module configured to detect a luminance level change in a luminance level distribution of a group of pixels on a horizontal line in the video frame, and to input a previous frame edge detection result indicating the luminance level change to the previous frame edge neighboring peak region detection module, and a previous frame edge neighboring peak region detection module configured to detect in pixel units or in a pixel unit an edge of a character of the subtitle part in the previous frame from the previous frame edge detection result.

2. The apparatus of claim 1, wherein for the subtitle part detected as the still subtitle by the still subtitle detection module, the interpolating frame is generated to use a zero vector as the motion vector of the subtitle part without using the motion vector detection result by the motion vector detection module.

3. The apparatus of claim 1, further comprising
    a previous frame divided region unit subtitle detection module configured to divide the previous frame into divided regions and to detect the subtitle part in divided region units or in a divided region unit, and
    a current frame divided region unit subtitle detection module configured to divide the current frame into divided regions and to detect the subtitle part in divided region units or in a divided region unit.

4. A still subtitle detection apparatus configured to detect in pixel units or in a pixel unit a subtitle part included in an image in one video frame including a plurality of pixels, the apparatus comprising:
    a subtitle part determination module configured to determine within the one video frame, as the subtitle part, a pixel or a pixel group
        on a first luminance region side that neighbors a detection position of an image edge where a first luminance level changes, or
        on a second luminance region side that neighbors a detection position of an image edge where a second luminance level changes, the second luminance level being lower than the first luminance level;
    a still subtitle detection module configured to detect the subtitle part as a still subtitle by comparing two video frames and determining that the subtitle part remains unchanged in the two video frames, the two video frames being continuous along a time axis, wherein an input image signal including the subtitle part includes a previous frame and a current frame having a first frame rate; and a frame interpolation module configured to convert the input image signal into an output image signal having a second frame rate higher than the first frame rate, the frame interpolation module including a motion vector detection module configured to detect a motion vector of an input image from the previous frame and the current frame of the input image signal, and an interpolating frame insertion module configured to insert an interpolating frame having the second frame rate between the previous frame and the current frame, and the interpolating frame insertion module is configured to generate the interpolating frame based on a motion vector detection result by the motion vector detection module or a still subtitle detection result by the still subtitle detection module, wherein the subtitle part determination module includes a current frame edge detection module configured to detect a luminance level change in a luminance level distribution of a group of pixels on a horizontal line in the video frame, and to input a current frame edge detection result indicating the luminance level change to the current frame edge neighboring peak region detection module, and a current frame edge neighboring peak region detection module configured to detect in pixel units or in a pixel unit an edge of a character of the subtitle part in the current frame from the current frame edge detection result.

5. The apparatus of claim 4, wherein for the subtitle part detected as the still subtitle by the still subtitle detection module, the interpolating frame is generated to use a zero vector as the motion vector of the subtitle part without using the motion vector detection result by the motion vector detection module.

6. The apparatus of claim 4, further comprising
a previous frame divided region unit subtitle detection module configured to divide the previous frame into divided regions and to detect the subtitle part in divided region units or in a divided region unit, and
a current frame divided region unit subtitle detection module configured to divide the current frame into divided regions and to detect the subtitle part in divided region units or in a divided region unit.

7. A still subtitle detection apparatus configured to detect in pixel units or in a pixel unit a subtitle part included in an image in one video frame including a plurality of pixels, the apparatus comprising:
a subtitle part determination module configured to determine within the one video frame, as the subtitle part, a pixel or a pixel group
on a first luminance region side that neighbors a detection position of an image edge where a first luminance level changes, or
on a second luminance region side that neighbors a detection position of an image edge where a second luminance level changes, the second luminance level being lower than the first luminance level; and
a still subtitle detection module configured to detect the subtitle part as a still subtitle by comparing two video frames and determining that the subtitle part remains unchanged in the two video frames, the two video frames being continuous along a time axis,
wherein the subtitle part is formed of a first character type indicating that the pixels in a region of the first luminance level continue for a given width from an edge of a character with the first luminance level, or a second character type indicating that the pixels in a region of the second luminance level continue for a given width from an edge of a character with the second luminance level.

8. The apparatus of claim 7, wherein the input image signal including the subtitle part includes a previous frame and a current frame having a first frame rate, and wherein:
the still subtitle detection apparatus comprises a frame interpolation module configured to convert the input image signal into an output image signal having a second frame rate higher than the first frame rate;
the frame interpolation module includes
a motion vector detection module configured to detect a motion vector of an input image from the previous frame and the current frame of the input image signal, and
an interpolating frame insertion module configured to insert an interpolating frame having the second frame rate between the previous frame and the current frame; and
the interpolating frame insertion module is configured to generate the interpolating frame based on
a motion vector detection result by the motion vector detection module or
a still subtitle detection result by the still subtitle detection module.

9. The apparatus of claim 8, wherein for the subtitle part detected as the still subtitle by the still subtitle detection module, the interpolating frame is generated to use a zero vector as the motion vector of the subtitle part without using the motion vector detection result by the motion vector detection module.

10. The apparatus of claim 8, further comprising
a previous frame divided region unit subtitle detection module configured to divide the previous frame into divided regions and to detect the subtitle part in divided region units or in a divided region unit, and
a current frame divided region unit subtitle detection module configured to divide the current frame into divided regions and to detect the subtitle part in divided region units or in a divided region unit.

11. The apparatus of claim 8, wherein the subtitle part determination module includes a previous frame edge detection module and a previous frame edge neighboring peak region detection module, and wherein:
the previous frame edge detection module is configured to detect a luminance level change in a luminance level distribution of a group of pixels on a horizontal line in the video frame, and to input a previous frame edge detection result indicating the luminance level change to the previous frame edge neighboring peak region detection module, and
the previous frame edge neighboring peak region detection module is configured to detect in pixel units or in a pixel unit an edge of a character of the subtitle part in the previous frame from the previous frame edge detection result.

12. The apparatus of claim 8, wherein the subtitle part determination module includes a current frame edge detection module and a current frame edge neighboring peak region detection module, and wherein:
the current frame edge detection module is configured to detect a luminance level change in a luminance level distribution of a group of pixels on a horizontal line in the video frame, and to input a current frame edge detection result indicating the luminance level change to the current frame edge neighboring peak region detection module, and the current frame edge neighboring peak region detection module is configured to detect in pixel units or in a pixel unit an edge of a character of the subtitle part in the current frame from the current frame edge detection result.

13. The apparatus of claim 7, wherein the subtitle part determination module comprises:
an edge detecting module configured to detect an edge of the subtitle part based on a difference between the luminance levels within the one video frame; and
a determining module configured to determine as the first character type or the second character type a continuous pixels existing region in which same luminance level pixels continuously exist near the edge detected by the edge detecting module.

14. A still subtitle detection apparatus configured to detect in pixel units or in a pixel unit a subtitle part included in an image in one video frame including a plurality of pixels, the apparatus comprising:
a subtitle part determination module configured to determine within the one video frame, as the subtitle part, a pixel or a pixel group
on a first luminance region side that neighbors a detection position of an image edge where a first luminance level changes, or
on a second luminance region side that neighbors a detection position of an image edge where a second luminance level changes, the second luminance level being lower than the first luminance level; and
a still subtitle detection module configured to detect the subtitle part as a still subtitle by comparing two video frames and determining that the subtitle part remains unchanged in the two video frames, the two video frames being continuous along a time axis,
wherein the subtitle part determination module comprises
an edge detecting module configured to detect an edge of the subtitle part based on a difference between the luminance levels within the one video frame; and
a determining module configured to determine a continuous pixels existing region in which same luminance level pixels continuously exist near the edge detected by the edge detecting module.

15. The apparatus of claim 14, wherein the input image signal including the subtitle part includes a previous frame and a current frame having a first frame rate, and wherein:
the still subtitle detection apparatus comprises a frame interpolation module configured to convert the input image signal into an output image signal having a second frame rate higher than the first frame rate;
the frame interpolation module includes
a motion vector detection module configured to detect a motion vector of an input image from the previous frame and the current frame of the input image signal, and an interpolating frame insertion module configured to insert an interpolating frame having the second frame rate between the previous frame and the current frame; and the interpolating frame insertion module is configured to generate the interpolating frame based on
a motion vector detection result by the motion vector detection module or
a still subtitle detection result by the still subtitle detection module.

16. The apparatus of claim 15, wherein for the subtitle part detected as the still subtitle by the still subtitle detection module, the interpolating frame is generated to use a zero vector as the motion vector of the subtitle part without using the motion vector detection result by the motion vector detection module.

17. The apparatus of claim 15, further comprising
a previous frame divided region unit subtitle detection module configured to divide the previous frame into divided regions and to detect the subtitle part in divided region units or in a divided region unit, and
a current frame divided region unit subtitle detection module configured to divide the current frame into divided regions and to detect the subtitle part in divided region units or in a divided region unit.

18. The apparatus of claim 15, wherein the subtitle part determination module includes a previous frame edge detection module and a previous frame edge neighboring peak region detection module, and wherein:
the previous frame edge detection module is configured to detect a luminance level change in a luminance level distribution of a group of pixels on a horizontal line in the video frame, and to input a previous frame edge detection result indicating the luminance level change to the previous frame edge neighboring peak region detection module, and
the previous frame edge neighboring peak region detection module is configured to detect in pixel units or in a pixel unit an edge of a character of the subtitle part in the previous frame from the previous frame edge detection result.

19. The apparatus of claim 15, wherein the subtitle part determination module includes a current frame edge detection module and a current frame edge neighboring peak region detection module, and wherein:
the current frame edge detection module is configured to detect a luminance level change in a luminance level distribution of a group of pixels on a horizontal line in the video frame, and to input a current frame edge detection result indicating the luminance level change to the current frame edge neighboring peak region detection module, and
the current frame edge neighboring peak region detection module is configured to detect in pixel units or in a pixel unit an edge of a character of the subtitle part in the current frame from the current frame edge detection result.

* * * * *